United States Patent [19]
Araki et al.

[11] Patent Number: 5,764,609
[45] Date of Patent: Jun. 9, 1998

[54] DISK DATA REPRODUCING METHOD AND APPARATUS FOR READING DATA AT ARBITRARY SPEED

[75] Inventors: Tetsuya Araki; Yoshiro Kashiwabara, both of Kasuga, Japan

[73] Assignee: Matsushita Electric Industrial Co., Ltd., Osaka, Japan

[21] Appl. No.: 587,039

[22] Filed: Jan. 16, 1996

[30] Foreign Application Priority Data

Jan. 19, 1995 [JP] Japan ................................. 7-006399
Feb. 20, 1995 [JP] Japan ................................. 7-031220

[51] Int. Cl.⁶ ................................................. G11B 7/00
[52] U.S. Cl. ........................ 369/50; 369/47; 369/44.28
[58] Field of Search ............................. 369/50, 54, 47, 369/59, 48, 58, 44.28, 44.29, 32, 60; 360/73.03, 73.08, 73.06

[56] References Cited

U.S. PATENT DOCUMENTS

| | | | |
|---|---|---|---|
| 4,481,615 | 11/1984 | Hioki | 369/50 |
| 4,530,083 | 7/1985 | Ishihara | 369/207 |
| 5,161,142 | 11/1992 | Okano | 369/50 |
| 5,224,086 | 6/1993 | Wachi | 369/50 |
| 5,528,574 | 6/1996 | Takeuchi et al. | 369/50 |
| 5,535,183 | 7/1996 | Miura et al. | 369/50 |

*Primary Examiner*—Thang V. Tran

[57] ABSTRACT

In the operation to access data on a disk, the data reading operation is enabled before the rotary speed of the spindle motor of the disk is completely regulated to thereby minimize the access time and power consumption of the spindle motor for acceleration or deceleration thereof. When the actuator is in the access operation, the motor is compulsorily driven. From a time when the actuator reaches a target track in the access operation to a time when the rotary speed of the motor becomes equal to a predetermined rotary speed, the frequency control signal is created according to the position of the actuator and the rotary speed of the spindle motor. After the data reading operation is commenced, to fixedly set the data transfer rate to a predetermined value, the variable reference clock signal is stepwise corrected to be equal to the fixed master clock signal in a frequency range calculated according to the motor rotating speed and the capture range. Therefore, the synchronization can be established in a frequency range remarkably exceeding the capture range of the phase-locked loop circuit, which makes it possible to dispense with the wait time conventionally required in the access operation before the motor rotating speed reaches a fixed linear speed for data reproduction.

17 Claims, 11 Drawing Sheets

DISK DATA REPRODUCING METHOD AND APPARATUS FOR READING DATA AT ARBITRARY SPEED

BACKGROUND OF THE INVENTION

1. Field of the Invention

The present invention relates to an optical disk driver for driving and controlling an optical disk recording medium.

2. Description of the Related Art

Recent rapid technological innovation in the fields of information processing technology leads to necessity of large-capacity storage media. In this situation, optical disk recording media have attracted attention as small-size, low-cost, and large-capacity storage media.

FIG. 12 shows the configuration of a conventional optical disk driving apparatus. In the apparatus of FIG. 12, a reference numeral 101 indicates an optical disk storage medium on which data of about 500 megabytes can be recorded with a fixed surface density. A numeral 102 denotes an actuator including an optical unit to read data from the medium 101 and a device to drive the optical unit 102. A numeral 103 represents a spindle motor to rotate the optical disk 101. A numeral 104 stands for a servo circuit to accomplish a servo control operation for the driver of the actuator 102 and a servo control operation to rotate the spindle motor 103 at a fixed linear speed. A numeral 105 designates a signal processing circuit to decode a signal obtained from the optical unit of the actuator 102 and conducts error correction for the decoded signal so as to resultantly produce data therefrom. A numeral 106 indicates a central processing unit (CPU) to control the overall operation of the optical disk driver.

Description will be now given of operations in a successive information reproducing operation and a disk accessing operation of the conventional optical disk driver thus constructed.

In the successive information reproduction, the servo circuit 104 controls a position of the actuator 102 in a focusing direction (denoted by an arrow F in FIG. 12) and a tracking direction (as indicated by an arrow T therein) of the actuator 102 such that the optical unit of the actuator 102 follows a track of the optical disk 101. At the same time, to read data written on the optical disk 101 with a fixed surface density, the servo circuit 104 controls the spindle motor 103 to rotate at a fixed linear speed. The signal attained from the optical unit of the actuator 102 is fed to the signal processing circuit 105. The circuit 105 decodes the signal and then corrects errors thereof so as to thereby produce a digital signal.

On the other hand, in the accessing stage (of the track seeking operation), there is employed a short jump or a long jump according to the number of tracks through which the actuator is to be moved. Namely, the short jump is used when only the optical unit is moved in the actuator 102, whereas the long jump is adopted to move the actuator 102.

Since the mass of the optical unit is small and the quantity in change of the spindle motor rotating speed is quite small, the short jump can be conducted in a relatively short period of time. However, in the long jump, a long period of time is required from when the actuator 102 is activated to be moved to when the actuator 102 is completely positioned at its destination because of the large mass of the actuator 102 and the large quantity in change of the motor rotating speed.

Consequently, to increase the operation speed of the optical disk driving apparatus (particularly, of an information searching facility), it is necessary to reduce the period of time to achieve the long jump when locating the actuator over destined tracks in the track accessing operation.

Analyzing the period of time necessary to move the actuator to the destination, there is required, even after the movement of the actuator is finished, a long period of time is required until the operation to appropriately control the rotating speed of the spindle motor is terminated. Namely, before the rotary speed of the motor is fixed to the desired linear speed, the actuator cannot read the data recorded on the disk at a fixed surface density. Therefore, the actuator enters the wait state and stays therein until the predetermined linear speed is developed. In other words, there occurs a wait period of time before a constant linear speed is obtained for the pertinent track of the optical disk.

Furthermore, to decrease the time required to control the rotating speed of the spindle motor, it is necessary to increase torque of the spindle motor, which leads to increase in the size and consumption power thereof. These problems inevitably occur especially when the transfer rate is desired to be increased, for example, by use of a quadruple-speed disk driving apparatus.

SUMMARY OF THE INVENTION

It is therefore an object of the present invention, which has been devised to solve the problems above, to make it possible to read data from the optical disk in an operation to access a track of the disk before the rotating speed of the spindle motor is completely regulated and to resultantly decrease the access time, thereby minimizing power consumption associated with acceleration and deceleration of the spindle motor.

To achieve the above object, according to a first aspect of the present invention, there is provided an optical disk driving apparatus including a spindle motor for driving rotation of an optical disk, means for sensing the number of rotations to thereby deciding a rotary speed of the spindle motor, an actuator for supporting an optical lens and an optical pickup movably in a focusing direction and a tracking direction, reference clock generating means for generating a fixed main clock signal as a reference of a signal processing, a spindle control circuit to control a rotary speed of the spindle motor, variable reference clock generating means for generating a variable reference clock signal having a variable oscillation frequency in response to a frequency control signal, a digital phase-locked loop (PLL) circuit for controlling the rotary speed of the spindle motor to be synchronized with a predetermined clock signal, and a central processing unit (CPU) for compulsorily driving the spindle motor when the actuator is in an access operation and producing the frequency control signal on the basis of the position of the actuator and the motor rotating speed in a period from the time when the actuator reaches a target track to the time when the rotary speed of the spindle motor is set to a predetermined rotary speed for a regular data reproduction, the CPU controlling the respective constituent components of the apparatus.

In the construction above of the optical disk driving apparatus according to the present invention, a variable reference clock signal is employed for the digital signal processing circuit and the PLL reference clock signal of the digital PLL circuit, leading to synchronization in a frequency range amazingly exceeding the capture range of the PLL circuit. This makes it possible to read data from the optical disk recording medium in an arbitrary data reproducing speed. After the data reading operation is started, to fixedly set the data transfer rate to a predetermined value, the variable reference clock signal is stepwise modified to be substantially equal to the fixed master clock signal in a frequency variation range calculated according to the rotary speed of the motor and capture range. In consequence, the reproduction wait time required for the motor rotating speed in the access operation to reach a fixed linear speed for data reproduction becomes unnecessary.

According to a second aspect of the present invention, there is provided an optical disk driving apparatus including opto-electric converting means for illuminating a laser beam onto a surface of an optical disk and converting light reflected on the surface into an electric signal, signal processing means for amplifying a signal outputted from the opto-electric means, controlling a focusing point of the laser beam to be set to a predetermined track position, reading data from the disk, and controlling rotation of a driving means for driving rotation of the disk, a central processing unit (CPU) for temporarily storing data obtained from the disk in a storage, transferring the data to an external device, and supervising procedures of the respective processing, and variable frequency oscillating means for producing under control of the CPU a clock signal having an arbitrary frequency. The signal processing means is operated according to the clock signal from the variable frequency oscillating means.

With the above configuration, when conducting a seek operation for an arbitrary address on a disk on which data is recorded in advance at a fixed linear speed, the clock signal from the variable frequency oscillating means is varied according to the seeking direction over the disk so as to operate the signal processing means on the basis of the varied clock signal. Due to the provision, before the disk rotary speed reaches the predetermined line speed, data can be read from the disk to be subjected to a desired signal processing, thereby transferring resultant data to an external device.

In consequence, even the seek operation is carried out, it is not necessary to wait for an event in which the disk rotating speed reaches the predetermined linear speed, leading to a higher-speed seek operation.

Moreover, when the data read operation is initiated with a clock signal having a frequency less than that of the predetermined clock signal, an amount of data which will appear as an insufficient portion of the predetermined amount of transfer data is beforehand accumulated in a buffer memory, thereby guaranteeing an amount of transfer data equal to or more than the predetermined amount of transfer data.

Additionally, according to either of the first and second aspects of the present invention, only a short period of time is required to accelerate or decelerate the spindle motor, the current value to be supplied to the spindle motor is lowered and hence the power consumption is minimized.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
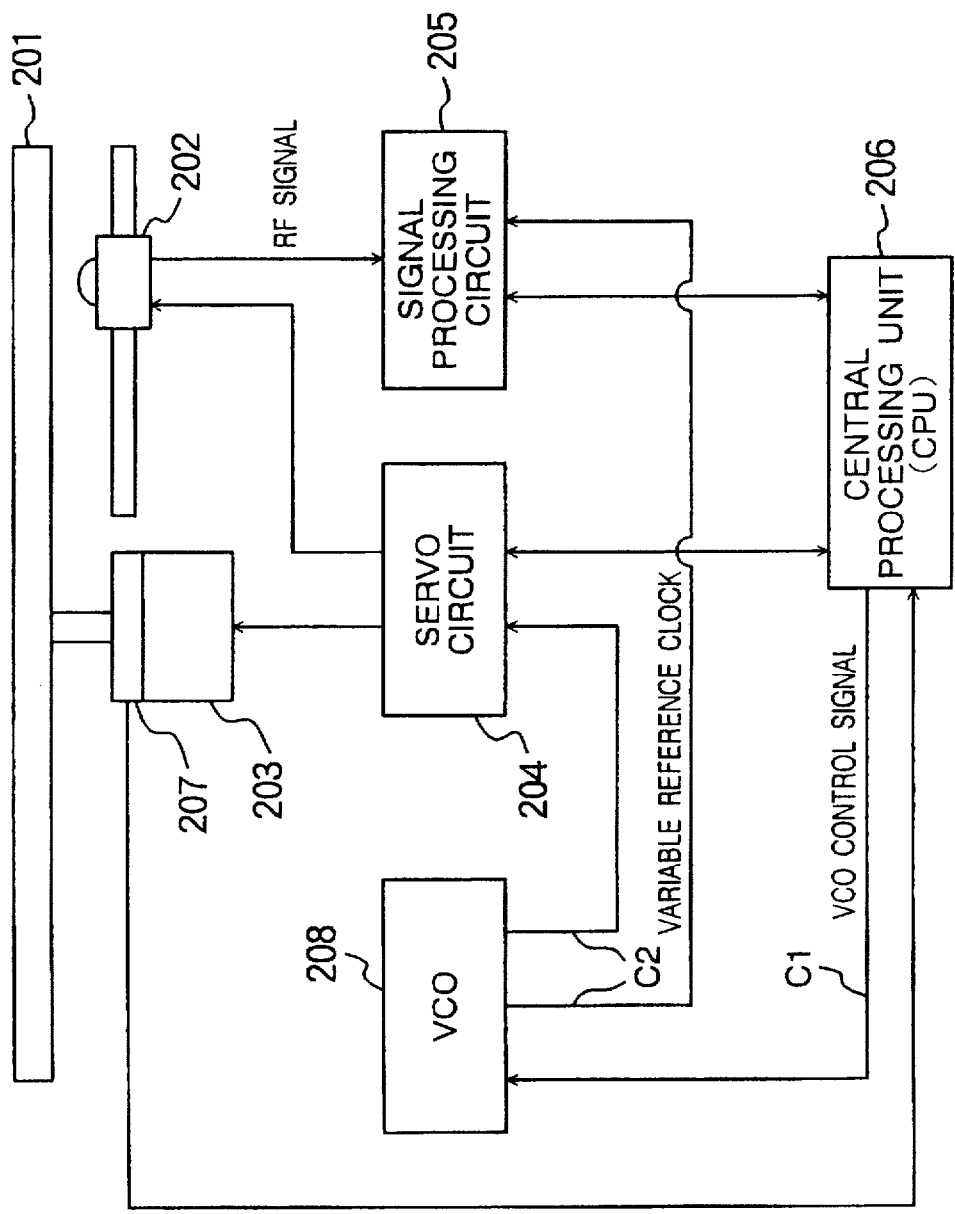
FIG. 1 is a block diagram showing the configuration of the optical disk driver according to a first embodiment of the present invention.
Figure 2:
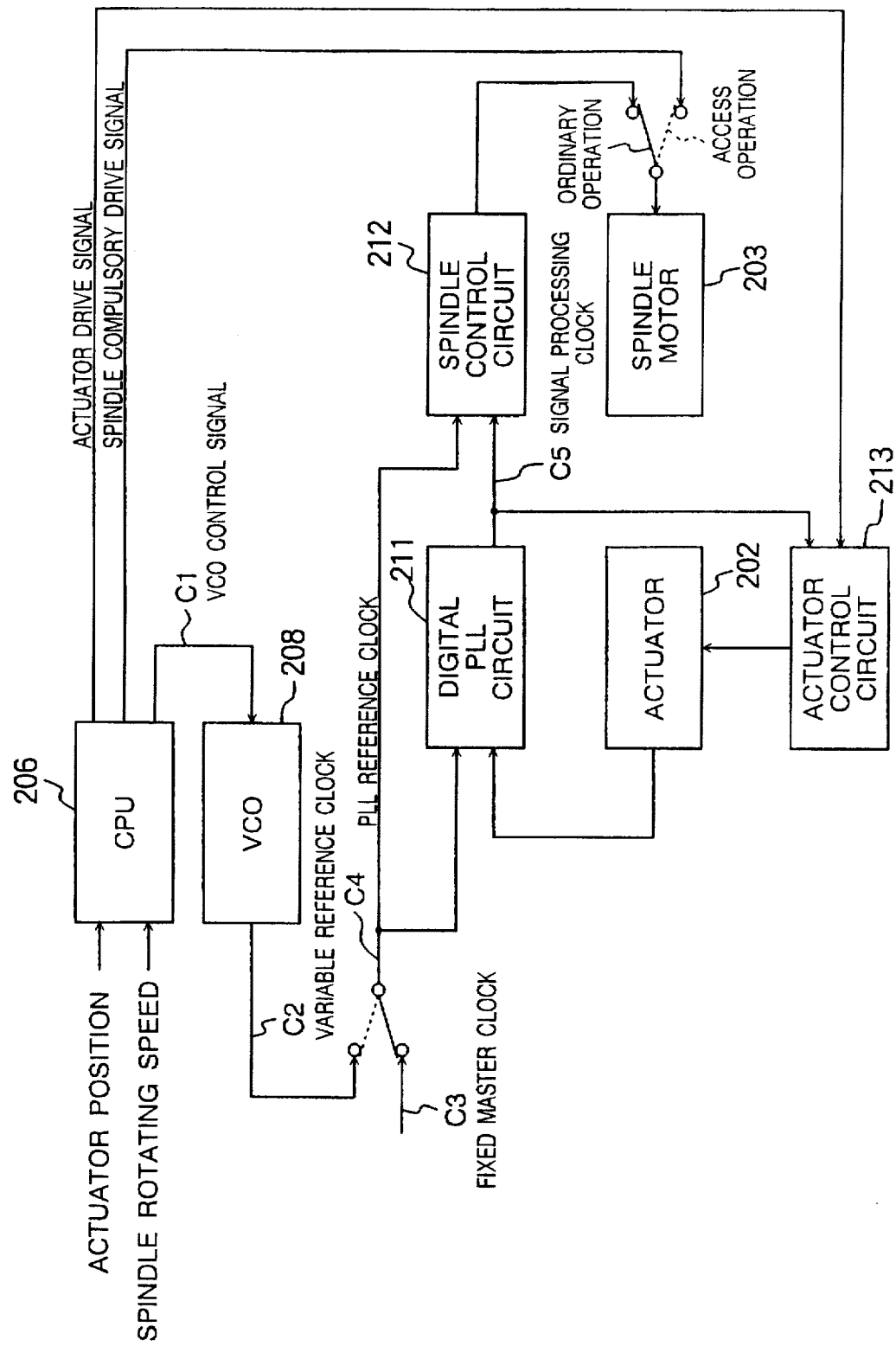
FIG. 2 is a functional block diagram showing in detail constituent elements of the driver of FIG. 1 associated with a variable frequency read control operation.
Figure 3:
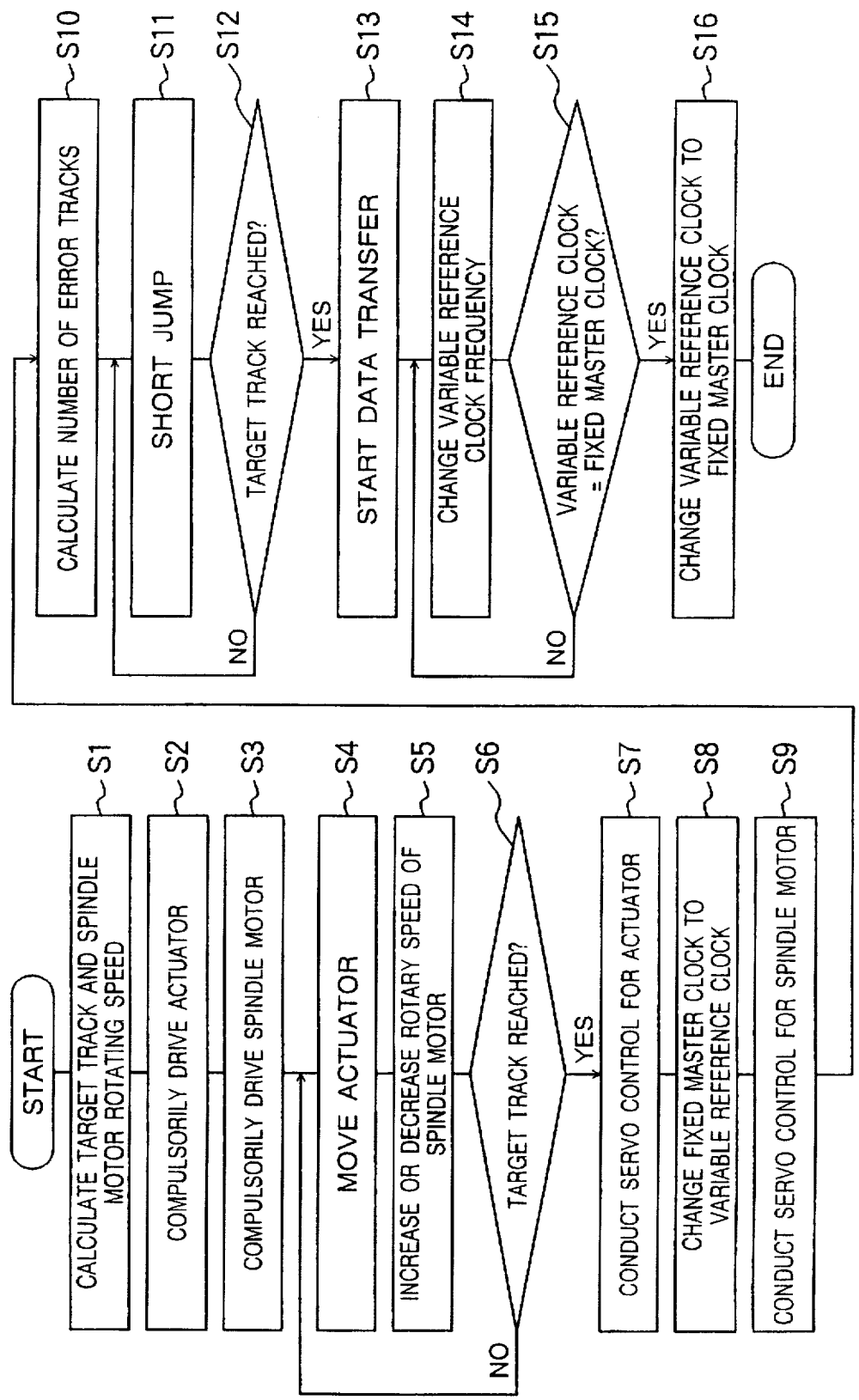
FIG. 3 is a flowchart showing operation of the driver in the long jump.

Referring now to FIGS. 1 to 3, description will be given of a first embodiment according to the present invention. FIG. 1 shows the configuration of an optical disk driver in the first embodiment of the present invention. FIG. 2 is a functional block diagram showing in detail the constituent elements related to an operation to control the variable frequency read operation of the optical disk driver as shown in FIG. 1, and FIG. 3 is a flowchart showing operation of the driver in the long jump.

In FIG. 1, a reference numeral 201 indicates an optical disk on which data of about 500 megabytes can be recorded at a constant surface density. A numeral 202 denotes an actuator including an optical unit to read data from the optical disk 201 and a driver thereof. Obtained from the optical unit is a radio frequency (RF) signal as a reproduced signal from the optical disk 201. A numeral 203 stands for a spindle motor to rotate the disk 201 at a fixed linear speed. A numeral 204 represents a servo circuit to carry out a servo control operation for the driver of the actuator 202 and for the spindle motor 203. A numeral 205 designates a signal processing circuit to decode the reproduced signal attained from the optical unit of the actuator 202 and to correct errors of the decoded signal so as to output obtained data therefrom. A numeral 206 indicates a central processing unit (CPU) to achieve the overall control operation of the system and to compulsorily drive the spindle motor 203 while the actuator 202 is conducting an access operation. After the destined track is positioned in the access operation, the CPU 206 produces a control signal C1 for a voltage controlled oscillator (VCO) on the basis of the position of the actuator 202 and the rotary speed of the spindle motor 203 during a priod of time until the spindle motor 203 is set to a rotary speed for the ordinary or regular signal reproduction. A numeral 207 indicates a rotary speed sensor circuit to sense the rotating speed of the spindle motor 203 and to produce therefrom a rotary speed sense signal. A numeral 208 is a voltage controlled oscillator (VCO) to generate a variable reference clock signal C2 in which the oscillation frequency of the oscillator 208 varies according to the VCO control signal C1 from the CPU 206.

FIG. 2 is a functional block diagram showing in detail the constituent components related to the procedure to control the variable frequency read operation of the optical disk driver of FIG. 1. In the construction of FIG. 2, the same system components as those of FIG. 1 are assigned with the same reference numerals and the duplicated description thereof will be avoided. A reference numeral 211 indicates a digital phase-locked loop (PLL) circuit which generates the clock signal C5 for the processing of signals as the control object so that a data stream included in the reproduced signal synchronizes with the PLL reference clock signal C4 employed as a reference signal. A numeral 212 is a spindle control circuit to supervise the rotating speed of the spindle motor 203 on the basis of the clock signal C5. A numeral 213 is an actuator control circuit to receive an actuator drive signal from the CPU 206 so as to control operation of the actuator 202. As can be seen from FIGS. 1 and 2, the digital PLL circuit 211, spindle control circuit 212, and actuator control circuit 213 are included in the servo circuit 204.

Description will be next given of operation of the optical disk driver thus configured according to the first embodiment of the present invention. First, in the continuous data reproduction, the servo circuit 204 controls a position of the actuator 202 in the focusing and tracking directions such that the optical unit of the actuator 202 follows a track of the optical disk 201.

Simultaneously, to read data recorded on the disk 201 at the fixed surface density, the servo circuit 204 adjusts the rotary speed of the spindle motor 203 to be set to a fixed linear speed. In the successive data reproduction, the operation to control the rotary speed of the spindle motor 203 is accomplished only by the servo circuit 204. The oscillation frequency of the VCO 208 is kept constant to retain the transfer rate at a predetermined value. The reproduced signal thus obtained from the optical unit of the actuator 202 is fed to the signal processing circuit 205. The signal is decoded and is then subjected to error correction to be transformed into a digital signal. In this connection, the operation above as well as description thereof are the same as those employed in the conventional optical disk driver.

In the data access operation, the system primarily carries out a short jump and a long jump. The short jump is achieved in a short period of time because of the small quantity in change of the rotary speed of the spindle motor 203. Consequently, the operation of the system is similar to that conducted in the continuous data reproduction.

In contrast therewith, there occurs a large quantity in change of the rotary speed of the spindle motor 203 in the long jump. Therefore, the oscillation frequency of the VCO 208 is altered according to the reproduced signal to decrease the wait time for reading data until the settlement of the rotary speed of the spindle motor 203.

FIG. 3 is a flowchart showing operation of the long jump. Referring to FIGS. 2 and 3, description will be given of the operation in the long-jump access.

First, the CPU 206 calculates a target track and a target spindle motor rotating speed on the basis of an address of data to be accessed (step 1 to be abbreviated as S1 herebelow).

Subsequently, the CPU 206 turns the actuator servo and spindle servo off and then compulsorily drives the actuator 202 (S2) and spindle motor 203 (S3). In consequence, the actuator 202 starts moving from its position (S4) and the spindle motor 203 increases or decreases the rotary speed thereof (S5).

When the actuator 202 starts its action, the CPU 206 monitors arrival of the actuator 202 at the target track (S6). If the track has not been reached yet, the CPU 206 continuously executes steps S4 to S6.

When the target track is reached, the CPU 206 changes its operation from the compulsory drive to the servo control operation of the actuator 202 (S7). At the same time, the CPU 206 changes the signal source of the PLL reference clock signal C4 into the variable reference clock signal C2 and then outputs the VCO control signal C1 to the VCO 208 (S8). Moreover, the CPU 206 changes the compulsory drive of the spindle motor 203 according to the compulsory drive signal into the control operation by the spindle control circuit 212 (S9).

Description will be given of the control operations in the steps 7 to 9 and the actual behavior of the optical disk driver. The actuator 202 has moved to a position in the vicinity of the target track and the spindle motor 203 is increasing or decreasing the rotary speed thereof to develop a predetermined linear speed related to the pertinent track position.

In this situation, the CPU 206 beforehand calculates, on the basis of the position of the actuator 202 and the rotation speed of the motor 203, a frequency (data rate) of the reproduced signal which is assumed to be obtained from the actuator 202, thereby outputting the estimated VCO control signal C1. In response to the VCO control signal C1, the VCO 208 carries out oscillation at a frequency corresponding to the VCO control signal C1 to thereby produce the variable reference clock signal C2.

As a result, although the rotary speed of the spindle motor 203 has not yet reached the predetermined linear speed for the pertinent track position, the digital PLL circuit 211 produces the signal processing clock signal C5 in synchronism with the obtained variable reference clock signal C2.

Consequently, a spindle control servo system including the spindle control circuit 212, the spindle motor 203, the actuator control circuit 213, the actuator 202, and the digital PLL circuit 211 can be synchronized with the reproduced signal having a frequency range remarkably exceeding the capture range of the PLL circuit 211 and hence data can be read from the optical disk 201.

The CPU 206 calculates a number of error tracks relative to the target track on the basis of the obtained address (S10) and conducts the short jump until the target track is reached (S11, S12). In consequence, without waiting for termination of the control operation of the spindle motor rotary speed, the data can be read and the transfer of the obtained data can be commenced (S13).

In this stage, however, although the long-jump access has already been finished, the spindle motor 203 is increasing or decreasing its speed to the predetermined linear speed. To set the data transfer speed to a predetermined constant value, a frequency of the variable reference clock signal C2 is varied to be substantially equal to that of the fixed master clock signal C3 (S14). In this case, the range of change in the frequency is stepwise altered according to the range of variation in the frequency derived from the rotation speed of the motor 203 and the capture range.

In this fashion, the clock signal C2 is modified in a step-by-step manner until frequencies of the clock signals C2 and C3 become equal to each other (S14 and S15). When they are equal to each other, the signal source of the PLL reference clock signal C4 is changed to the fixed master clock signal C3 (S16) and the access operation is finished, and then the ordinary reproduction mode is restored.

Subsequently, the loop characteristic of each of the servo systems will be verified in relation to alteration in the reproduction speed. In the first embodiment of the present invention, there is adopted a digital servo system including a digital filter such that a sampling clock signal thereof is produced by dividing the frequency of the signal processing clock signal C5. The method of correcting the loop characteristic of the servo system in association with the variable reproduction characteristic will be now described with reference to the graph of loop characteristics.

Figure 4:
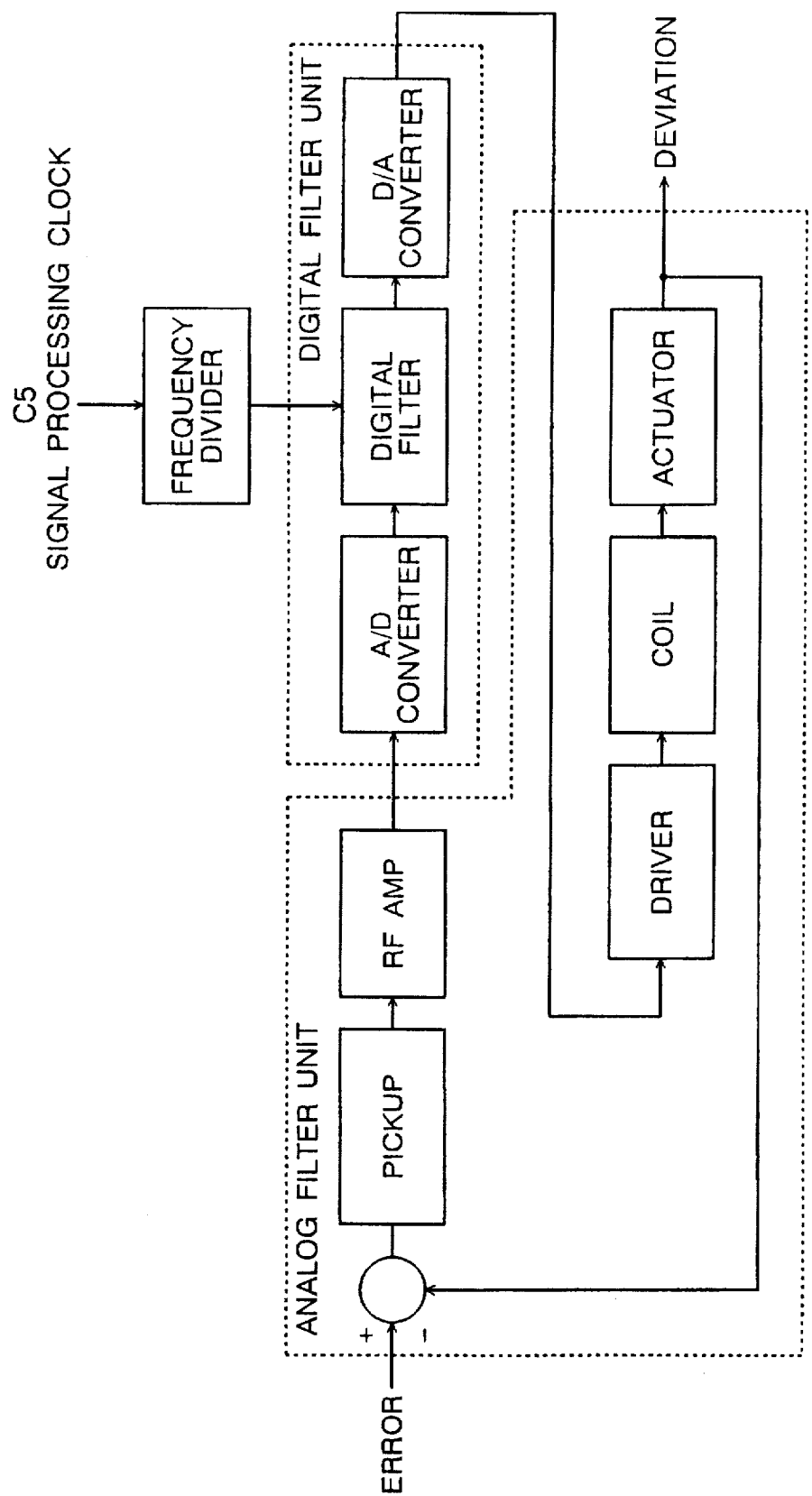
FIG. 4 is a block diagram showing constitution of the servo circuit in the tracking and focusing control systems.
Figure 5:
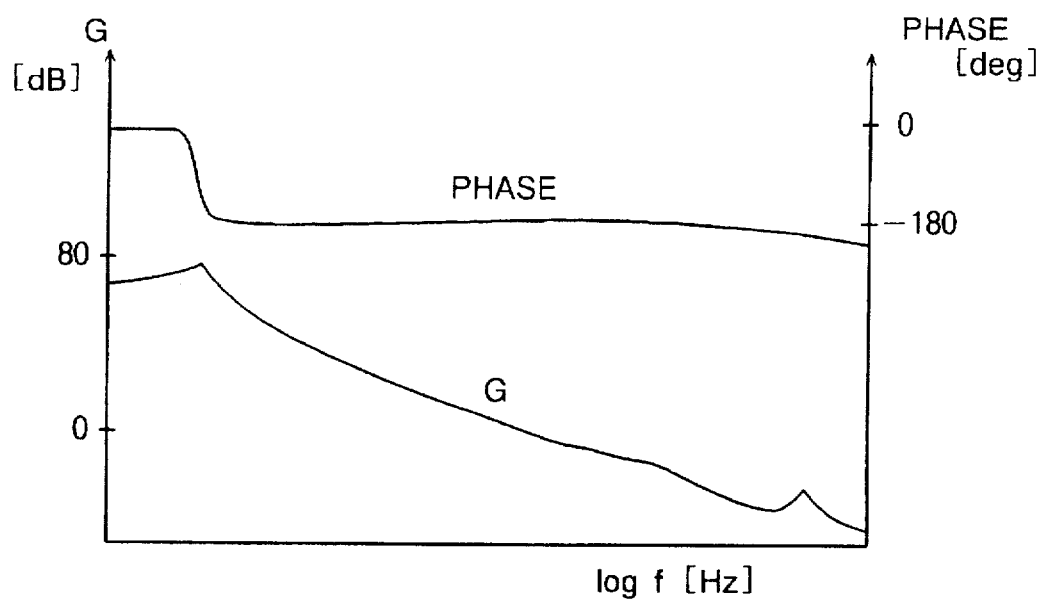
FIG. 5 is a graph showing the loop characteristic of an analog filter unit of FIG. 4.
Figure 6:
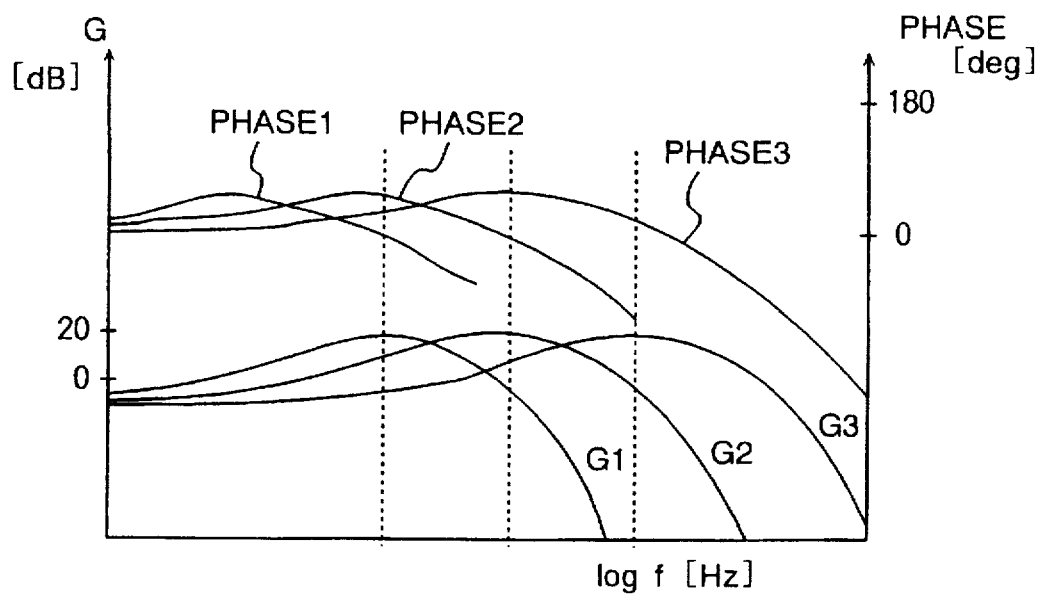
FIG. 6 is a graph showing the loop characteristic of a digital filter unit of FIG. 4.

FIG. 4 shows in a block diagram the tracking and focusing control systems in which a digital filter unit and an analog filter unit are respectively enclosed with dotted lines. Moreover, as described above, the sampling clock signal of the digital filter is produced by dividing the frequency of the signal processing clock signal C5 of FIG. 2. FIGS. 5 and 6 are graphs respectively showing the loop characteristics respectively of the analog and digital filter units of FIG. 4.

The loop characteristic of the digital filter unit is generally represented by a transfer function H(z), $$z = \exp(j\omega t) = \exp(j \cdot 2\pi(f/f_s))$$

where, f indicates a frequency and $f_s$ denotes a sampling frequency. Consequently, the loop characteristic can be shifted in the direction of the axis of frequency by altering the sampling frequency.

Figure 7:
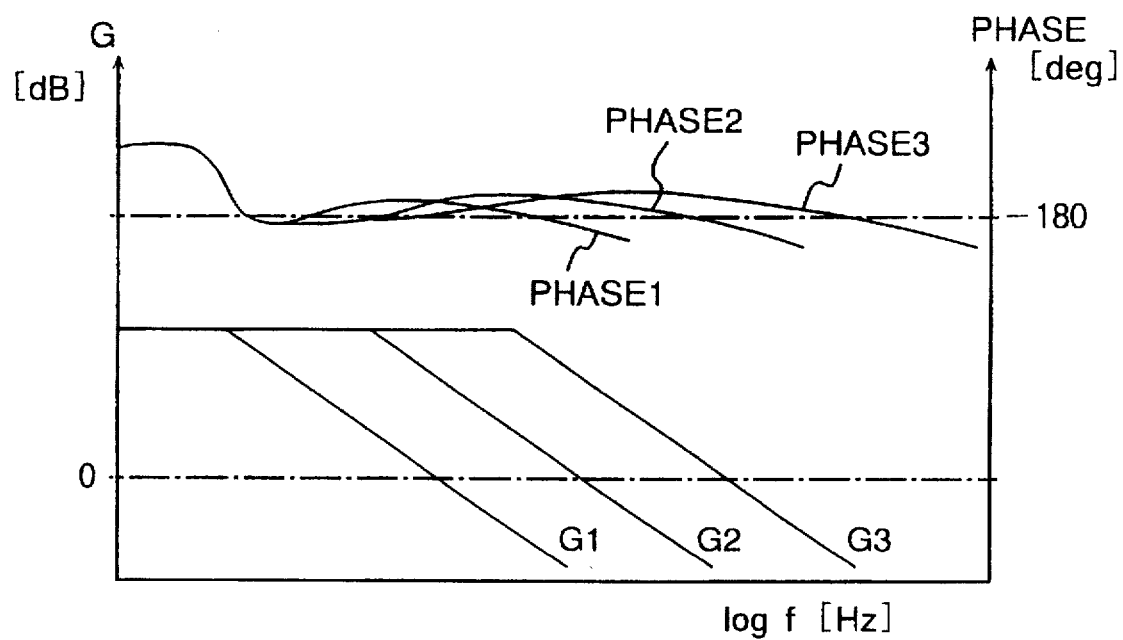
FIG. 7 is a graph showing a favorable loop characteristic.

FIG. 7 is a graph showing a favorable loop characteristic. As can be seen from this graph, when the loop characteristic (FIG. 5) of the analog filter unit is accordingly modified, a stable loop characteristic (FIG. 7) can be attained in a wide range by changing the sampling frequency of the digital filter unit. That is, synchronizing the reference clock signal of the digital servo with the signal processing clock signal, there can be obtained a stable loop characteristic in any situation even when the data reproduction speed is altered (i.e., even when the PLL reference clock signal C4 is varied).

In this connection, as the servo characteristic of the tracking and servo control system above, there is required a response in a high-frequency range according to rotation (related to, for example, eccentricity) of the disk 201. On the other hand, however, a loop characteristic in a low-frequency range is satisfactory for the spindle servo (i.e., there is not required the loop gain in a high-frequency due to a low-speed change in the rotary speed). Therefore, the verification of frequency characteristics required for the servo characteristic of the tracking and focusing control systems is not necessary.

As described above, according to the first embodiment of the present invention, it is possible to read data from an optical disk at an arbitrary reproduction speed. Due to this advantage, the wait time required to settle the rotary speed of the spindle motor in the long jump can be utilized for the data read operation, which leads to reduction in the access time.

Additionally, since the abrupt acceleration or deceleration of the spindle motor is unnecessary, the size as well as power consumption of the motor can be minimized.

Figure 8:
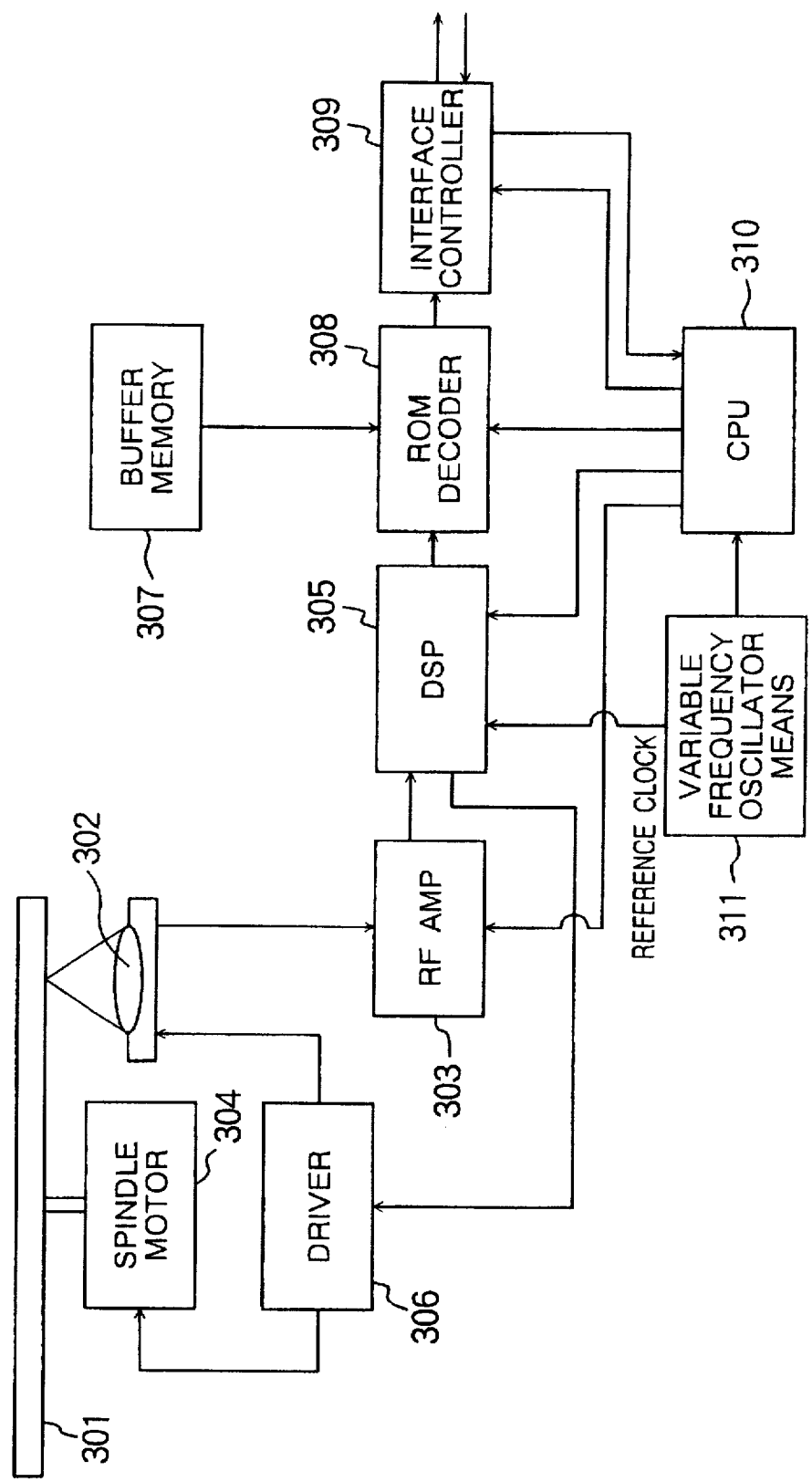
FIG. 8 is a block diagram showing structure of an optical disk driver according to a second embodiment of the present invention.

Next, description will be given of a second embodiment according to the present invention. FIG. 8 shows in a block diagram the constitution of an optical disk unit in the second embodiment according to the present invention. In this system, a laser beam emitted from a light-emitting element is irradiated onto an optical disk 301. A reference numeral 302 indicates a pickup unit including an optical system to convert a reflection light from the optical disk 301 into an electric signal. Included further in the configuration is an RF amplifier 303 to amplify the RF signal obtained from the pickup unit 302. A numeral 305 denotes a digital signal processor (DSP) to control a data read control operation. The DSP 305 controls the laser beam from the pickup unit 302 to be collected onto a predetermined track position and adjusts the rotary speed of the spindle motor 304 to rotate the optical disk 301 at a speed suitable for the data read operation, thereby reading data reproduced from the optical disk 301.

The system further includes a driver 306 to control the pickup unit 302 and spindle motor 304 according to signals produced from the DSP 305. A numeral 308 stands for a read-only memory (ROM) decoder 308 to decode signals from the DSP 305 so as to store the decoded signals in a buffer memory 307. There is also provided an interface controller 309 which is responsive to an instruction from a host computer externally connected to this system to arbitrate between the instruction and information internally obtained and to transfer data therefrom. A numeral 310 represents a central processing unit (CPU) to control the RF amplifier 303, the DSP 305, the ROM decoder 308, and the interface controller 309.

A numeral 311 designates variable frequency oscillator means to generates a clock signal having an arbitrary frequency under control of the CPU 310. In this connection, the clock signal created from the variable frequency oscillator means 311 is used as a processing reference clock signal of the DSP 305.

Figure 9:
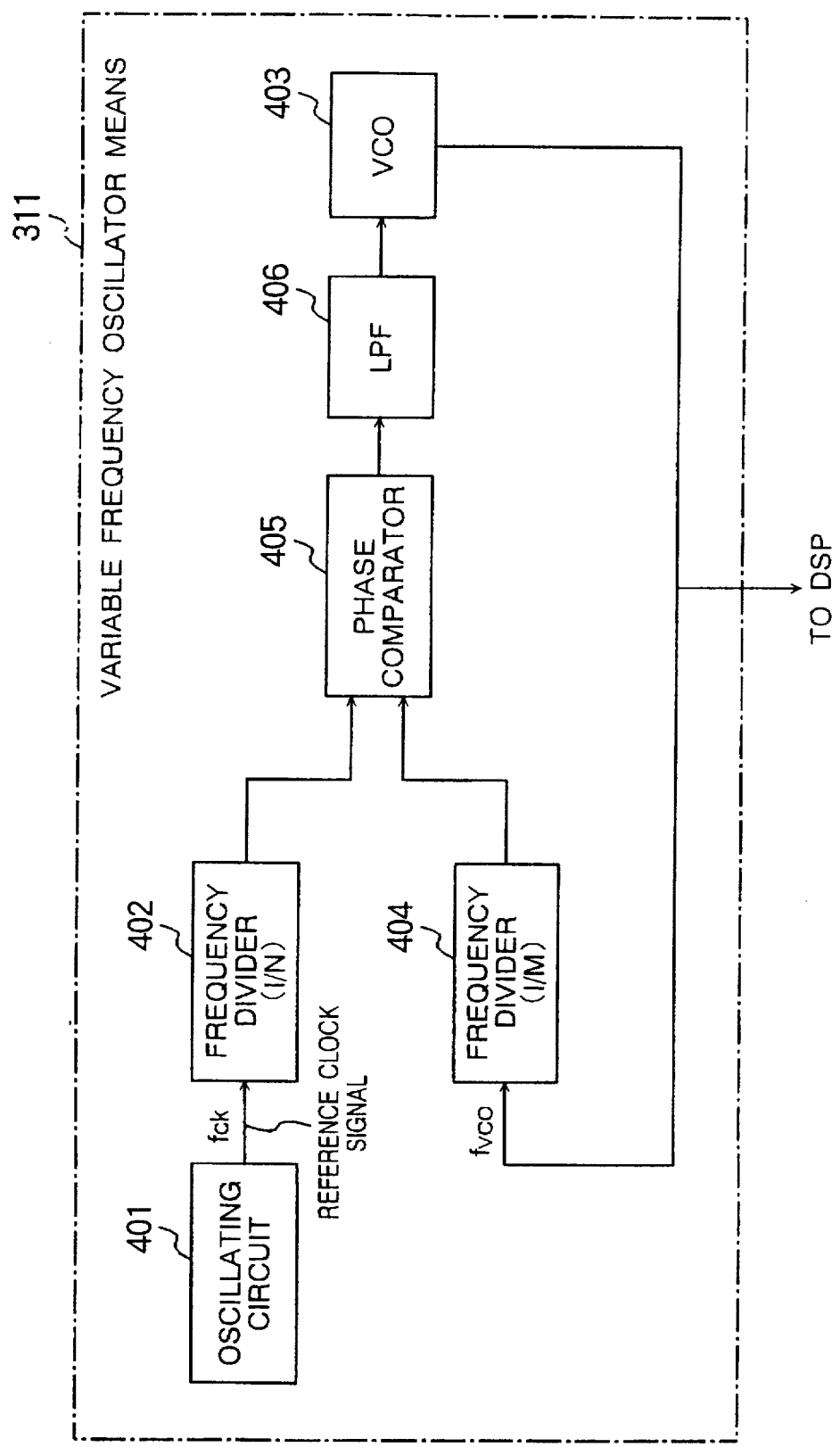
FIG. 9 is a block diagram showing constitution of variable frequency oscillating means of FIG. 8.

Next, operation of the variable frequency oscillator means 311 will be described in detail. FIG. 9 is a block diagram showing the circuit structure of the variable frequency oscillator means 311 of FIG. 8. In FIG. 9, a phase-locked loop (PLL) circuit is constituted with the following constituent components. In this regard, for convenience of the circuit configuration, the oscillator means 311 may be arranged in the DSP 305 depending on cases.

An oscillating circuit 401 oscillates at a predetermined frequency to produce a clock signal $f_{ck}$ as a reference signal. A 1/N frequency divider 402 divides the reference clock signal ($f_{ck}$) from the oscillating circuit 401 by N (a constant value beforehand set to the circuit). On the other hand, an 1/M frequency divider 404 divides a signal from a voltage-controlled oscillator (VCO) 403, which will be described later. The value of M can be changed by the CPU 310. A phase comparator circuit 405 compares the signals from the dividers 402 and 404 with each other to sense a phase difference between the signals so as to output therefrom the sensed phase difference. A low-pass filter (LPF) 406 shapes a waveform of the signal from the phase comparator 405 to produce therefrom a voltage signal. The VCO 403 oscillates at a frequency according to the signal from the LPF 406 to produce therefrom a clock signal ($f_{vco}$).

Subsequently, description will be given of operation of the variable frequency oscillator means 311 thus constructed. First, in the ordinary operation state, the PLL circuit operates to equalize the clock frequency ($f_{ck}/N$) obtained by dividing the frequency ($f_{ck}$) of the reference clock signal by N to the clock frequency ($f_{vco}$) obtained by dividing the frequency (fvco) of the signal from the VCO 403. Consequently, when the same value is set to M and N, the VCO 403 oscillates to establish a condition $f_{vco}=f_{ck}$.

In addition, assuming that the value of M is obtained by multiplying the value of N by a (i.e., M=a·N), there is obtained a relation of $f_{vco}=a \cdot f_{ck}$. In consequence, there can be generated a clock signal having an arbitrary oscillation frequency by setting M to a desired value by the CPU 310.

Furthermore, in association with operation of the DSP 305, since the signal from the variable frequency oscillator means 311 is employed as the reference clock of the DSP 305, the characteristic thereof also varies according to the frequency of the reference clock signal. That is, between the data transfer speed $V_{data}$ and the frequency $f_{vco}$, there exists a relationship $V_{data}=b \cdot f_{vco}$, where b is a constant decided by the data processing.

Moreover, in the actual operation of reading data written on the optical disk 301 at a fixed linear speed v (constant), there exists a relationship of $v=2\pi rn/60$, where r is the radius of the optical disk 301 at a position where the pickup unit 302 is located and n indicates the current number of rotations. Resultantly, $n=60v/2\pi r$ can be derived. Therefore, when a seek operation is accomplished from an outer side ($r_{out}$) to an inner side ($r_{in}$), there is obtained between the respective numbers of rotations $n_{out}$ and $n_{in}$ a relationship of $n_{out} < n_{in}$ because the relationship between the associated radii is $r_{out} > r_{in}$.

According to the operation above, description will be given of the seek operation and data transfer speed. First, the seek operation from an external circumferential position to an internal circumferential position will be described. FIGS. 10A to 10D are timing charts of the seek operation from an external position to an internal position of the optical disk in the second embodiment of the present invention. When the seek operation is started in a direction from an external position to an internal position, the value of M of the frequency divider 404 is reduced to be less than that of N under control of the CPU 310. In consequence, the variable frequency oscillator mean s 311 oscillates at a frequency ($f_{vco-down}$) less than the reference clock frequency $f_{ck}$ to produce a reference clock signal having the resultant frequency.

Since the overall characteristics are varied proportionally as described above, the processing is commenced with a number of rotations and at a transfer speed which are respectively lower than the predetermined values. Therefore, in contrast with the conventional technology in which the address reference and data read operations cannot be executed until the number of rotations of the optical disk 301 reaches the predetermined number of rotations $n_{in}$, the address reference and data read operations can be accomplished when the number of rotations reaches $n_{in-down}$ (less than $n_{in}$) as can be seen from FIG. 10B according to the present invention.

Figure 10A:
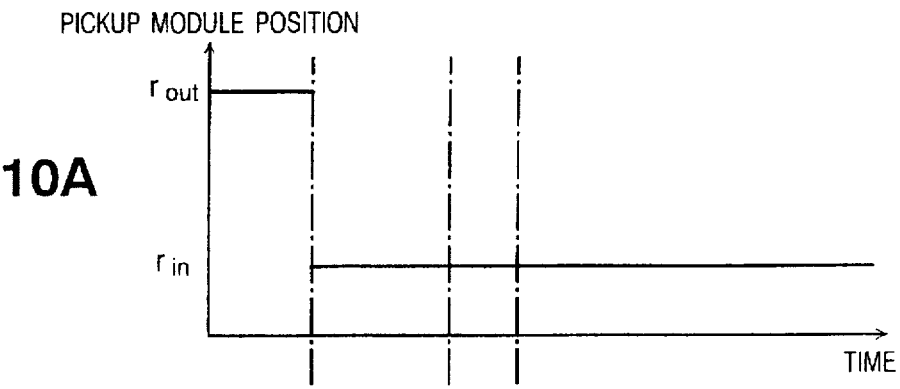
FIGS. 10A to 10D are timing charts for explaining the seek operation from an outer circumferential position to an inner circumferential position in the optical disk driver of the second embodiment.
Figure 10B:
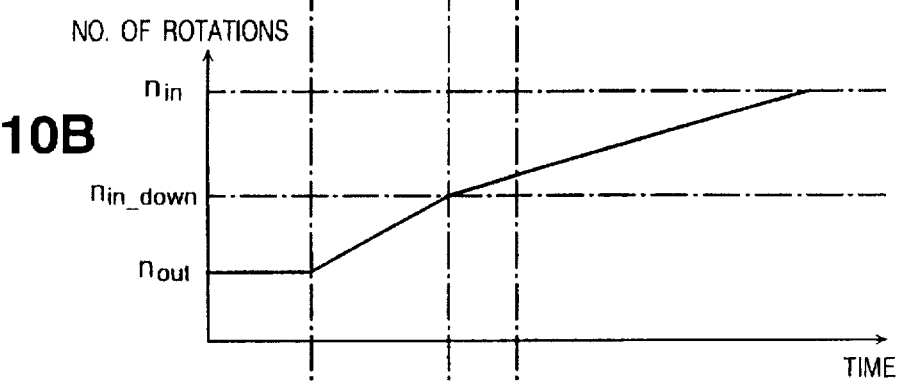
Figure 10C:
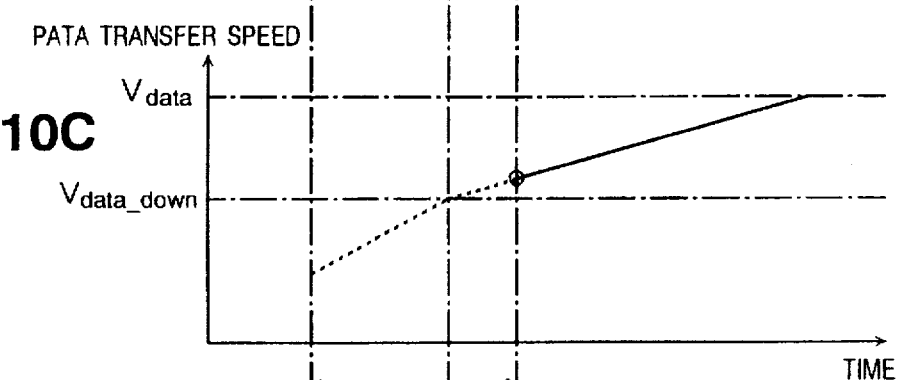

When the data read operation is initiated, the value of M of the frequency divider 404 is controlled by the CPU 310 to vary substantially in a linear fashion the reference clock frequency from $f_{vco-down}$ to $f_{ck}$. This prevents interruption of the data transfer in a range of the data transfer speed from $V_{data-down}$ to $V_{data}$. Consequently, after the access operation is thus achieved, it is possible to provide the desired quantity of transfer data (FIG. 10C).

Figure 10D:
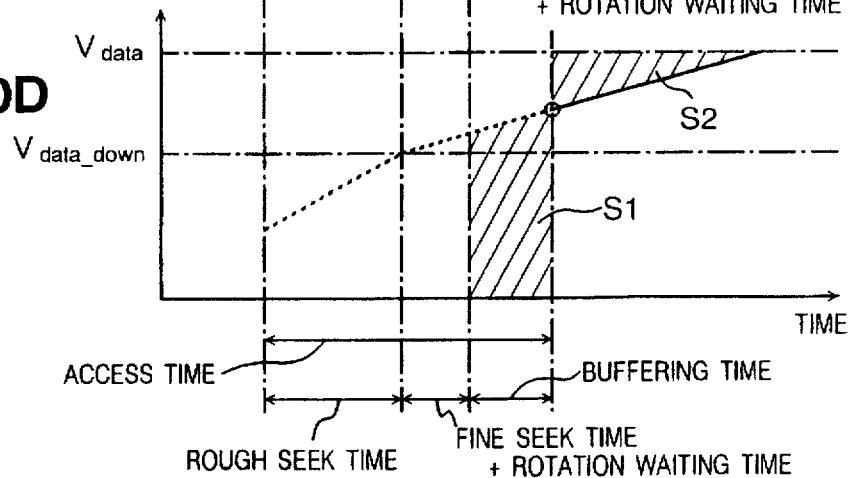

However, since data is read from the disk at a low speed in the initial data reading stage in the above method, the following control operation is employed to guarantee a fixed data transfer speed or rate. FIG. 10D is a timing chart in which a fixed data transfer rate is reserved. In FIG. 10D, the read-out data is accumulated in the buffer memory 307 such that an area S1 of the amount of transfer data is equal to an area S2 related to data in a portion in which the data transfer rate is insufficient. When S1 exceeds S2, the data transfer is started.

Figure 11A:
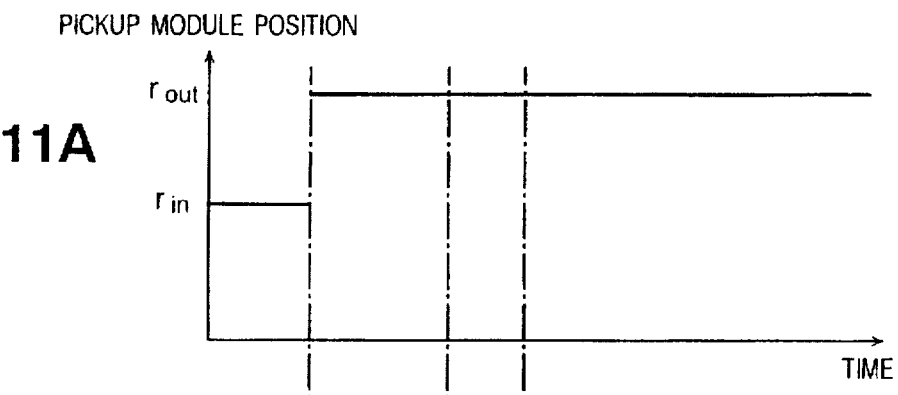
FIGS. 11A to 11C are timing chart showing the seek operation from an inner circumferential position to an outer circumferential position in the optical disk driver of the second embodiment.
Figure 11B:
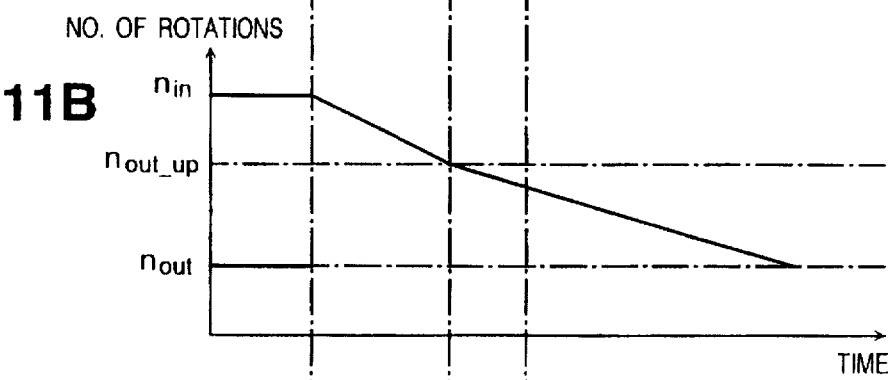
Figure 11C:
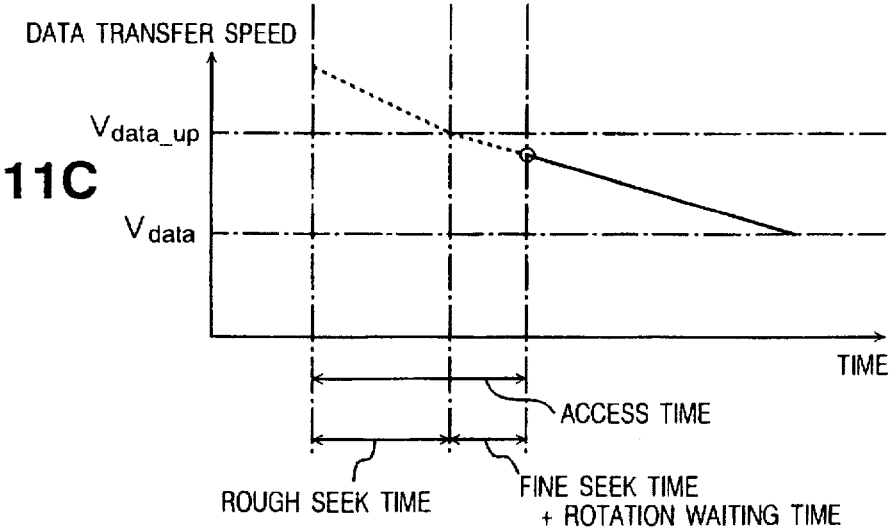
Figure 12:
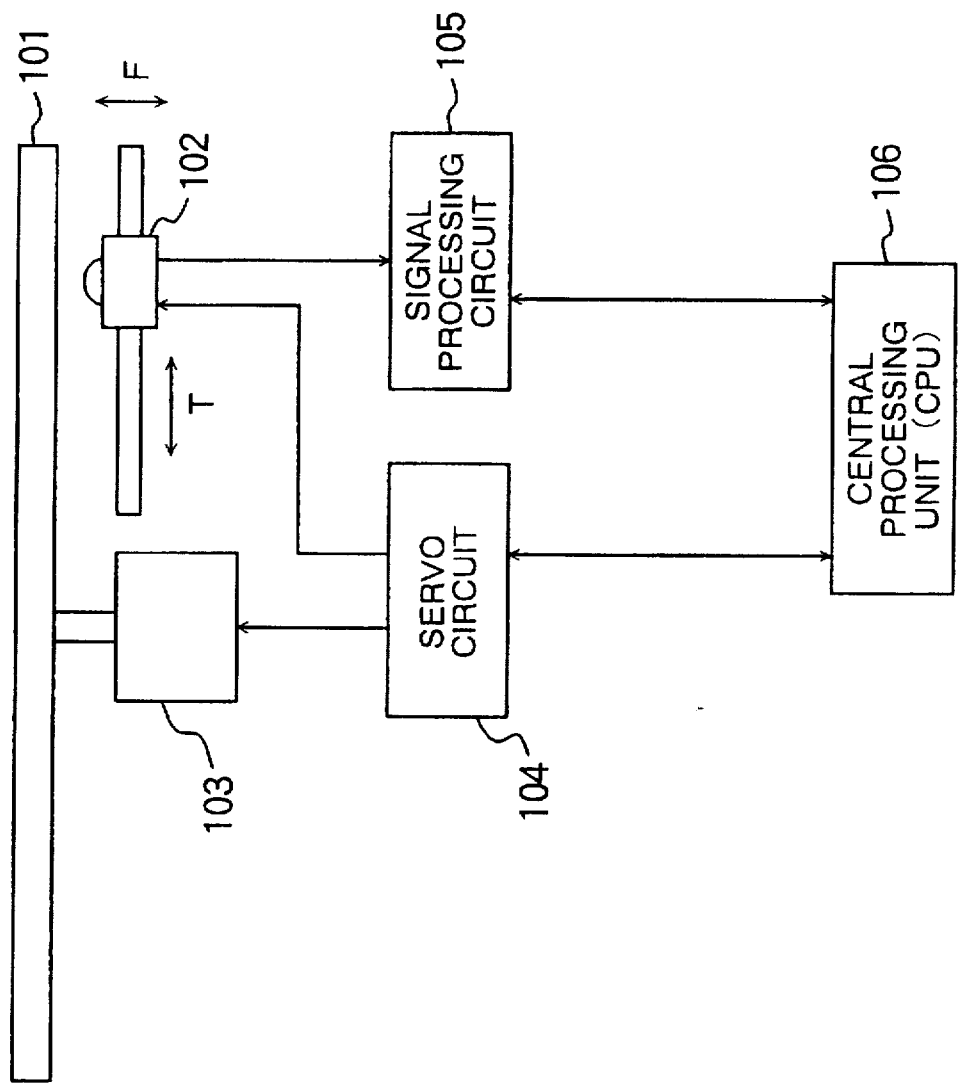
FIG. 12 is a block diagram showing the configuration of a conventional optical disk driver.

FIGS. 11A to 11C are timing charts showing a seek operation from an inner circumferential position to an outer circumferential position of the optical disk in the embodiment. In the seek operation, the value of M of the frequency divider 404 is increased to exceed that of N under control of the CPU 310. The variable frequency oscillator means 311 accordingly oscillates at a frequency $f_{vco-up}$ which is higher than the reference clock frequency $f_{ck}$ to thereby generates a reference clock signal of the resultant frequency.

Since the overall characteristics are varied proportionally as described above, the processing is commenced with a larger number of rotations and at a higher data transfer speed. Consequently, when compared with the conventional technology in which the address reference and data read operations cannot be conducted until the number of rotations of the optical disk 301 is lowered down to the nominal number of rotations $n_{out}$, the address reference and data read operations can be accomplished when the number of rotations reaches $n_{out-up}$ higher than $n_{out}$ according to the embodiment as shown in FIG. 11B.

When the data read operation is started, the value of M of the frequency divider 404 is controlled by the CPU 310 to linearly alter the reference clock frequency from $f_{vco-up}$ to $f_{ck}$, thereby continuously guaranteeing the data transfer rate after the access operation is conducted. In this connection, since the data transfer rate cannot be less than the regular data transfer rate in the seek operation from an inner position to an outer position of the disk 301, there is not required to conduct the data buffering operation or the like (FIG. 11C).

Although a method of reading data with the data buffering operation is explained in the second embodiment, it is needless to say that the same method can be applied to the first embodiment such that reading of data is controlled by using the buffer memory 307.

Due to the configuration of the present invention, in a seek operation for an arbitrary address, the data reading operation is initiated by changing the reference clock signal depending on the seek direction, i.e., from an inner position to an outer position or vice versa. Consequently, the period of time to increase or decrease the rotation speed of the spindle motor can be minimized and hence the current value supplied to the motor is lowered. Furthermore, the insufficient data which will appear when the data read operation is commenced with a frequency lower than the reference clock frequency is accumulated in the buffer memory in advance. Therefore, it is guaranteed to reserve the data transfer rate equal to or more than the predetermined data transfer rate. Consequently, the device capable of conducting a high-speed seek operation can be configured with the minimized size, thickness, and power consumption.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A method of reproducing data from a disk, the method comprising:
   (a) driving a rotation of the disk with a driving means;
   (b) sensing a rotary speed of the disk, and controlling the driving means to set the rotary speed of the disk to a desired rotary speed;
   (c) reading the data recorded on the disk by using a converting means and producing a reproduced signal containing a data stream which represents the data;
   (d) moving an actuator for supporting the converting means in at least a tracking direction;
   (e) conducting a servo control operation for the driving means in accordance with the reproduced signal;
   (f) generating a variable reference clock signal having a variable frequency;

(g) synchronizing the data stream with a synchronizing reference clock signal by controlling the driving means; and (h) employing the variable reference clock signal as the synchronizing reference clock signal during a time period after an access operation is started until the rotary speed of the disk reaches a predetermined rotary speed for regular reproduction of the data and thereby reading the data from the disk at an arbitrary rotary speed of the disk.

2. A method as in claim 1, wherein the disk is an optical disk.

3. A method as in claim 2, wherein step (c) comprises:
(i) irradiating a laser beam onto a surface of the disk;
(ii) transforming light reflected from the surface into an electric signal; and
(iii) producing the reproduced signal in accordance with the electric signal.

4. A method as in claim 3, wherein step (d) comprises moving the actuator in a focusing direction.

5. A disk driving apparatus comprising:
driving means for driving rotation of a disk;
sensing means for sensing a rotary speed of the disk;
rotation control means for controlling the driving means to set the rotary speed of the disk to a desired rotary speed;
converting means for reading data on a surface of the disk and producing an electric signal containing a data stream in accordance with the data;
actuator means for movably supporting the converting means to be movable in at least a tracking direction;
signal processing means for amplifying the electric signal output from the converting means and thereby obtaining a reproduced signal;
servo control means for conducting a servo control operation for the rotation control means and the actuator means on the basis of an output signal of the sensing means and the reproduced signal;
variable frequency oscillating means for generating a variable reference clock signal having a frequency calculated on the basis of the rotary speed of the disk and a position of the converting means; and
phase-locked loop (PLL) means for controlling the rotation control means to synchronize the data stream with a synchronizing reference clock signal;
wherein the phase-locked loop (PLL) means employs the variable reference clock signal as the synchronizing reference clock signal in a time period after the actuator means starts an access operation until the rotary speed of the disk reaches a predetermined rotary speed for regular reproduction of the data and thereby starts to read the data from the disk prior to completion of a control operation for controlling the rotary speed of the disk to reach the predetermined rotary speed.

6. A disk driving apparatus as in claim 5, wherein:
the disk is an optical disk; and
the converting means comprises an optical lens and an optical pickup, the optical pickup comprising means for (i) irradiating a laser beam through the optical lens onto the surface of the disk and (ii) transforming light reflected from the surface through the optical lens into the electric signal.

7. A disk driving apparatus as in claim 6, wherein the actuator means comprises means for movably supporting the converting means to be movable in a focusing direction.

8. A method of reproducing data from a disk, the method comprising:
(a) driving a rotation of the disk with driving means;
(b) sensing a rotary speed of the disk, and controlling the driving means to set the rotary speed of the disk to a desired rotary speed;
(c) reading the data recorded on the disk by using a converting means and obtaining a reproduced signal containing a data stream which represents the data;
(d) moving an actuator for supporting the converting means in at least a tracking direction;
(e) conducting a servo control operation for the driving means in accordance with the reproduced signal;
(f) generating a fixed main clock signal to be used for obtaining a reproduced signal in step (c);
(g) generating a variable reference clock signal having a variable frequency;
(h) synchronizing the data stream with a synchronizing reference clock signal by using a phase-locked loop (PLL) means to control the driving means;
(i) employing the variable reference clock signal as the synchronizing reference clock signal during a time period after an access operation is started until the rotary speed of the disk reaches a predetermined rotary speed for regular reproduction of the data and thereby starting to read the data from the disk prior to completion of a control operation for controlling the rotary speed of the disk to reach the predetermined rotary speed; and
(j) stepwise changing, after reading of the data is started, the variable frequency of the variable reference clock signal in a capture range of the PLL means until the variable frequency of the variable reference clock signal becomes substantially equal to a frequency of the fixed main clock signal.

9. A method as in claim 8, wherein the disk is an optical disk.

10. A method as in claim 9, wherein step (c) comprises:
(i) irradiating a laser beam onto a surface of the disk;
(ii) transforming light reflected from the surface into an electric signal; and
(iii) producing the reproduced signal in accordance with the electric signal.

11. A method as in claim 10, wherein step (d) comprises moving the actuator in a focusing direction.

12. A disk driving apparatus comprising:
driving means for driving rotation of a disk;
sensing means for sensing a rotary speed of the disk;
rotation control means for controlling the driving means to set the rotary speed of the disk to a desired rotary speed;
converting means for reading data on a surface of the disk and producing an electric signal containing a data stream in accordance with the data;
actuator means for movably supporting the converting means to be movable in at least a tracking direction;
signal processing means for amplifying the electric signal output from the converting means and thereby obtaining a reproduced signal;
servo control means for conducting a servo control operation for the rotation control means and the actuator means on the basis of an output signal of the sensing means and the reproduced signal;

fixed main clock signal oscillating means for generating a fixed main clock signal used to process the reproduced signal;

variable frequency oscillating means for generating a variable reference clock signal having a frequency calculated on the basis of the rotary speed of the disk and a position of the converting means; and phase-locked loop (PLL) means for controlling the rotation control means to synchronize the data stream with a synchronizing reference clock signal; wherein:

the phase-locked loop (PLL) means employs the variable reference clock signal as the synchronizing reference clock signal in a time period after the actuator means starts an access operation until the rotary speed of the disk reaches a predetermined rotary speed for regular reproduction of the data and thereby starts to read the data from the disk prior to completion of a control operation for controlling the rotary speed to reach the predetermined rotary speed; and the servo control means stepwise changes, after reading of the data is started, the frequency of the variable reference clock signal in a capture range of the PLL means until the frequency of the variable reference clock signal becomes substantially equal to a frequency of the fixed main clock signal.

13. A disk driving apparatus as in claim 12, wherein:

the disk is an optical disk; and the converting means comprises an optical lens and an optical pickup, the optical pickup comprising means for (i) irradiating a laser beam through the optical lens onto the surface of the disk and (ii) transforming light reflected from the surface through the optical lens into the electric signal.

14. A disk driving apparatus as in claim 13, wherein the actuator means comprises means for movably supporting the converting means to be movable in a focusing direction.

15. An optical disk driving apparatus comprising:

driving means for driving rotation of a disk;

sensing means for sensing a rotary speed of the disk;

rotation control means for controlling the driving means to set the rotary speed of the disk to a desired rotary speed;

converting means for reading data on a surface of the disk and producing an electric signal containing a data stream in accordance with the data;

actuator means for movably supporting the converting means to be movable in at least a tracking direction;

signal processing means for amplifying the electric signal output from the converting means and thereby obtaining a reproduced signal;

servo control means for conducting a servo control operation for the rotation control means and the actuator means on the basis of an output signal of the sensing means and the reproduced signal;

fixed main clock signal oscillating means for generating a fixed main clock signal used to process the reproduced signal;

variable frequency oscillating means for generating a variable reference clock signal having a frequency calculated on the basis of the rotary speed and a position of the converting means;

phase-locked loop (PLL) means for controlling the rotation control means to synchronize the data stream with a synchronizing reference clock signal; and buffer means for temporarily storing therein the data read from the disk; wherein:

the phase-locked loop (PLL) means employs the variable reference clock signal as the synchronizing reference clock signal in a time period after the actuator means starts an access operation until the rotary speed of the disk reaches a predetermined rotary speed for regular reproduction of the data and thereby starts to read the data from the disk prior to completion of a control operation for controlling the rotary speed to reach the predetermined rotary speed;

the servo control means stepwise changes, after reading of the data is started, the frequency of the variable reference clock signal in a capture range of the PLL means until the frequency of the variable reference clock signal becomes substantially equal to a frequency of the fixed main clock signal; and the servo control means stores in the buffer means the data read from the disk when the actuator means is moved from an outer circumferential side to an inner circumferential side of the disk and transfers the data to an external device when the quantity of the data thus stored in the buffer means becomes substantially equal to a predetermined data accumulation amount.

16. A disk driving apparatus as in claim 15, wherein:

the disk is an optical disk; and the converting means comprises an optical lens and an optical pickup, the optical pickup comprising means for (i) irradiating a laser beam through the optical lens onto the surface of the disk and (ii) transforming light reflected from the surface through the optical lens into the electric signal.

17. A disk driving apparatus as in claim 16, wherein the actuator means comprises means for movably supporting the converting means to be movable in a focusing direction.

* * * * *